US005708820A

United States Patent [19]
Park et al.

[11] Patent Number: 5,708,820
[45] Date of Patent: Jan. 13, 1998

[54] NETWORK HIBERNATION SYSTEM FOR SUSPENDING AND RESUMING OPERATION OF COMPUTER SYSTEM OPERABLE IN NETWORK ENVIRONMENT IN EVENT OF POWER FAILURE OR PERIOD OF INACTIVITY

[75] Inventors: Noh-Byung Park, Seoul; Sang-Jin Lee, Kyonggi-do; Shung-Hyun Cho, Kyonggi-do; Jong-Sung Choi, Kyonggi-do, all of Rep. of Korea

[73] Assignee: SamSung Electronics Co., Ltd., Kyungki-do, Rep. of Korea

[21] Appl. No.: 547,422

[22] Filed: Oct. 25, 1995

[30] Foreign Application Priority Data

Oct. 25, 1994 [KR] Rep. of Korea ............ 27299/1994

[51] Int. Cl.$^6$ .................. G06F 1/30; G06F 1/32
[52] U.S. Cl. ................. 395/750; 395/182.22
[58] Field of Search .......... 395/750, 182.11, 395/182.13, 182.22; 364/707

[56] References Cited

U.S. PATENT DOCUMENTS

| | | | |
|---|---|---|---|
| 3,801,963 | 4/1974 | Chen | 360/5 |
| 4,143,283 | 3/1979 | Graf et al. | 307/66 |
| 4,665,536 | 5/1987 | Kim | 364/707 |
| 4,763,333 | 8/1988 | Byrd | 395/182.2 |
| 4,885,521 | 12/1989 | Crampton | 320/14 |
| 4,908,790 | 3/1990 | Little et al. | 395/182.12 |
| 5,018,148 | 5/1991 | Patel et al. | 395/182.2 |
| 5,021,983 | 6/1991 | Nguyen et al. | 364/707 |
| 5,204,963 | 4/1993 | Noya et al. | 395/750 |
| 5,247,619 | 9/1993 | Mutoh et al. | 395/283 |
| 5,276,865 | 1/1994 | Thorpe | 395/182.22 |
| 5,283,905 | 2/1994 | Saadeh et al. | 395/750 |
| 5,375,246 | 12/1994 | Kimura et al. | 395/750 |
| 5,396,637 | 3/1995 | Harwell et al. | 395/750 |
| 5,414,861 | 5/1995 | Horning | 395/750 |
| 5,428,806 | 6/1995 | Pocrass | 395/800 |
| 5,432,946 | 7/1995 | Allard et al. | 395/750 |
| 5,485,623 | 1/1996 | Kurokawa et al. | 395/182.2 |
| 5,548,763 | 8/1996 | Combs et al. | 395/750 |
| 5,560,021 | 9/1996 | Vook et al. | 395/750 |

*Primary Examiner*—Jack B. Harvey
*Assistant Examiner*—Sumati Lefkowitz
*Attorney, Agent, or Firm*—Robert E. Bushnell, Esq.

[57] ABSTRACT

A network hibernation system for use with a computer connected to a local area network (LAN) which is capable of retaining both data from the computer and data from the network environment created in connection with the LAN in the event of a power failure and also in the event that the computer is idle for a predetermined time period. Upon the restoration of power, the states of the computer and network hibernation system are resumed to the point before the occurrence of the power failure or the idle period. The system includes a network interface for connecting the computer to the local area network; a power controller connected to a data bus, for generating a time-out signal when the computer is in a non-use state during operation of the computer; a power supply connected to the data bus, for generating a power interrupt detection signal upon abrupt termination of a main power source to provide back-up power to the computer system for backing data of the computer in a network environment, and for terminating the back-up power upon reception of a power interrupt signal; a supplemental memory for storing data of the computer in the network environment; a system controller connected to the data bus, for controlling data of the computer in the network environment to be stored in the supplemental memory, for generating the power interrupt signal after the data of the computer in the network environment are stored in the supplemental memory in response to either the time-out signal or the power interrupt detection signal to set the computer in a network hibernation state, and for recovering stored data and restoring the computer in the network environment when the main power source is re-supplied to the computer; and a main memory for storing network hibernation information for the system controller to determine whether the computer is in the network hibernation state.

21 Claims, 12 Drawing Sheets

NETWORK HIBERNATION SYSTEM FOR SUSPENDING AND RESUMING OPERATION OF COMPUTER SYSTEM OPERABLE IN NETWORK ENVIRONMENT IN EVENT OF POWER FAILURE OR PERIOD OF INACTIVITY

CROSS-REFERENCE TO RELATED APPLICATIONS

This application makes reference to, incorporates the same herein, and claims all benefits accruing under 35 U.S.C. 517 §119 from an application for Network Hibernation System earlier filed in the Korean Industrial Property Office on 25 Oct. 1994 and assigned Ser. No. 27299/1994.

BACKGROUND OF THE INVENTION

1. Technical Field

This invention relates to personal computers used as local area network (LAN) servers, and more particularly to a network hibernation system for such personal computers capable of retaining data in a network environment during a power failure and restoring such network environment to its former state when power is re-supplied to the computer. The invention also relates to an automatic suspension of operation of a computer in a network environment during a period of non-use and resumption of operation at the point of suspension in order to reduce power consumption.

2. Background Art

Hibernation system is a system preferably having two functions: first, an emergent automatic data recovering function in which data of a computer is automatically stored in a supplementary memory device such as, a hard disk, when the power supply is cut off because of a power failure or a mistake by a user, and thereafter, such data is recovered and the computer is restored to its former state before the power failure when the power is supplied to the computer again. Second, a power saving function in which when the computer is not in use for a given time while using the computer, the power supply is automatically cut off after data of the computer is stored in a supplementary memory device, and thereafter, such data is recovered and the computer is restored to its former state when the power is re-supplied to the computer.

Conventional systems for computers having a data recovering function in the event of a power failure are illustrated, for example, in U.S. Pat. No. 5,414,861 for Data Protection System Using Different Levels Of Reserve Power To Maintain Data In Volatile Memories For Any Period Of Time issued to Homing, and in U.S. Pat. No. 5,396,637 for Data Processing System With Power-Fail Protected Memory Module issued to Harwell et al. These systems usually include a memory transfer device for transferring data stored in a volatile memory into a non-volatile memory (i.e., a memory that is capable of retaining data without power) upon a power termination or a power failure so that, when power is restored, a data refreshing device can transfer the data from the non-volatile memory back into the volatile memory and thereby restoring the computer to its exact state before the power failure, right down to the cursor position on the screen.

Separately, conventional systems for computers having a power saving function are illustrated, for example, in U.S. Pat. No. 5,021,983 for Suspend/Resume Apparatus And Method For Reducing Power Consumption In Battery Powered Computers issued to Nguyen et al. This system, for example, allows the user to turn off the computer during any period of non-use and to subsequently resume operation of the computer to exactly the same place before the shutdown.

More recent systems relating to the emergent automatic data recovering function and the power saving function for computers are disclosed in Korea Patent Application No. 93-31255 entitled The Supplementary Power Supply For Backing Up The Working Environment In An Emergency, filed on Dec. 30, 1993, Korea Patent Application No. 94-13919 entitled The Stop Clock Controlling Machine, filed on Jun. 20, 1994, Korea Utility Model Application No. 93-3116 entitled The Power Controlling Device Of The Computer Peripheral Equipment, filed on Mar. 4, 1993, and Korea Patent Application No. 92-14590 entitled The Circuit Generating The Power Interruption Signal In The Computer Peripheral Equipment, filed on Aug. 13, 1992.

In the conventional art, however, not only the data recovering and power saving techniques have not been implemented in a single apparatus, but they are intended for personal computers when operating independent from any other networks, for example, local area networks (LAN) in which a number of personal computers are connected together for sharing central files and other resources provided by a LAN server. That is, if a personal computer accesses to the LAN server and operates in a network environment, and a power failure occurs for any reason, the conventional data recovering system can only recover data from the computer, and not data from the network environment created in connection with the LAN server.

SUMMARY OF THE INVENTION

Accordingly, it is therefore an object of the present invention to provide a network hibernation system for use with computers connected to a local area network in which data recovering function and power saving function are implemented to recover data from the computers operating in a network environment and to reduce power consumption.

It is also another object of the present invention to provide a network hibernation system for personal computers capable of retaining data in a network environment during a power failure and restoring such data in the network environment to its former state when power of the computer is restored.

It is further an object of the present invention to provide an automatic suspension of operation for computers in a network environment during a period of non-use and resumption of operation at the point of suspension in order to reduce power consumption.

In order to achieve the above and other objects, the present invention contemplates upon a novel network hibernation system for use in a computer connected to a local area network as comprising: a network interface for connecting the computer to the local area network; a data bus; a power controller connected to the data bus, for generating a time-out signal when the computer is in a non-use state during operation; a power supply connected to the data bus, for generating a power interrupt detection signal upon abrupt termination of a main power source to provide back-up power to the computer for backing data of the computer in a network environment, and for terminating the back-up power upon reception of a power interrupt signal; an OR gate for generating a hibernation signal by logically combining the time-out signal and the power interrupt detection signal; a supplemental memory for storing data of the computer system in the network environment; a system controller connected to the data bus, for controlling data of the computer in the network environment to be stored in the supplemental memory, for generating the power interrupt signal after data of the computer in the network environment are stored in the supplemental memory in response to the hibernation signal to set the computer in a network hibernation state, and for recovering stored data and restoring the computer in the network environment when the main power source is re-supplied to the computer; and a memory for storing network hibernation information for the system controller to determine whether the computer is in the network hibernation state.

To accomplish the above objects, the present invention requires the loading of a network hibernation module into a memory of a system controller. The loading process comprises an initializing step in which a network interface is initialized upon commencement of operation; a disabling step in which an event signal is disabled in a mask register when the network hibernation is enabled after the system controller determines whether the network hibernation is enabled; a storing step in which network interface information is stored in the network hibernation information area in the memory; a storing step in which the information indicating that the network hibernation module is loaded in the system and the interrupt information in the network hibernation module or addresses are stored in the memory; a loading step in which a process routine of the network driver is loaded in the memory; and a step in which the network hibernation module is loaded in the memory when the network hibernation is enabled after the system controller determines whether the network hibernation is enabled and thereafter, terminates operation.

To accomplish the above and other objects, the present invention contemplates upon a suspension process comprising: a step in which a power supply for backing up of data outputs an AC interruption detection signal with power of a battery; a step in which a power controller outputs a time-out signal when an event has not occurred for sometime during the operation of the computer indicating that the computer is in an extended period of non-use; a step in which a hibernation interrupt occurs in the CPU and thereafter, the CPU determines whether a hibernation supporting network driver is installed upon occurrence of one of the AC interruption detection signal and the time-out signal; a step of invoking network hibernation module when the hibernation support network driver is installed; a step of resetting a network interface when the CPU determines that the network hibernation is enabled; a step of disabling the network interface and returning to the hibernation module after the contents of local memory is stored in a system memory when the local memory exists in the network interface; a step of storing all the contents of computer memory in a supplementary memory after the entire states of the computer hardware are stored; a step of interrupting the power with the power supply for backing up of data by outputting a power-off signal to the power supply for backing up of data; and a step of turning the computer to a hibernation state.

The present invention also contemplates upon a resuming process in which data of the computer previously stored in a supplemental memory is recovered and the working environment of the computer is restored to a former state before detection of either a power failure or a period of extended non-use during operation of the computer. The resuming process comprises a step of initializing and self-examining the computer when the power is applied again; a step of recovering the working environment to a state previous to the power-off by normally booting in case the computer is not in a hibernation mode or by recovering all the contents of computer memory stored in a supplementary memory in case the computer is in the hibernation mode; a step of invoking the network hibernation module when the system is in the network hibernation state; a step of initializing the network interface when the network hibernation is enabled after the network hibernation module has been invoked; a step of recovering the contents of local memory when there is local memory in the network interface and resetting the network interface; a step of returning to the hibernation module after the network interface is enabled; and a step of operating the computer in the working environment before hibernation.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
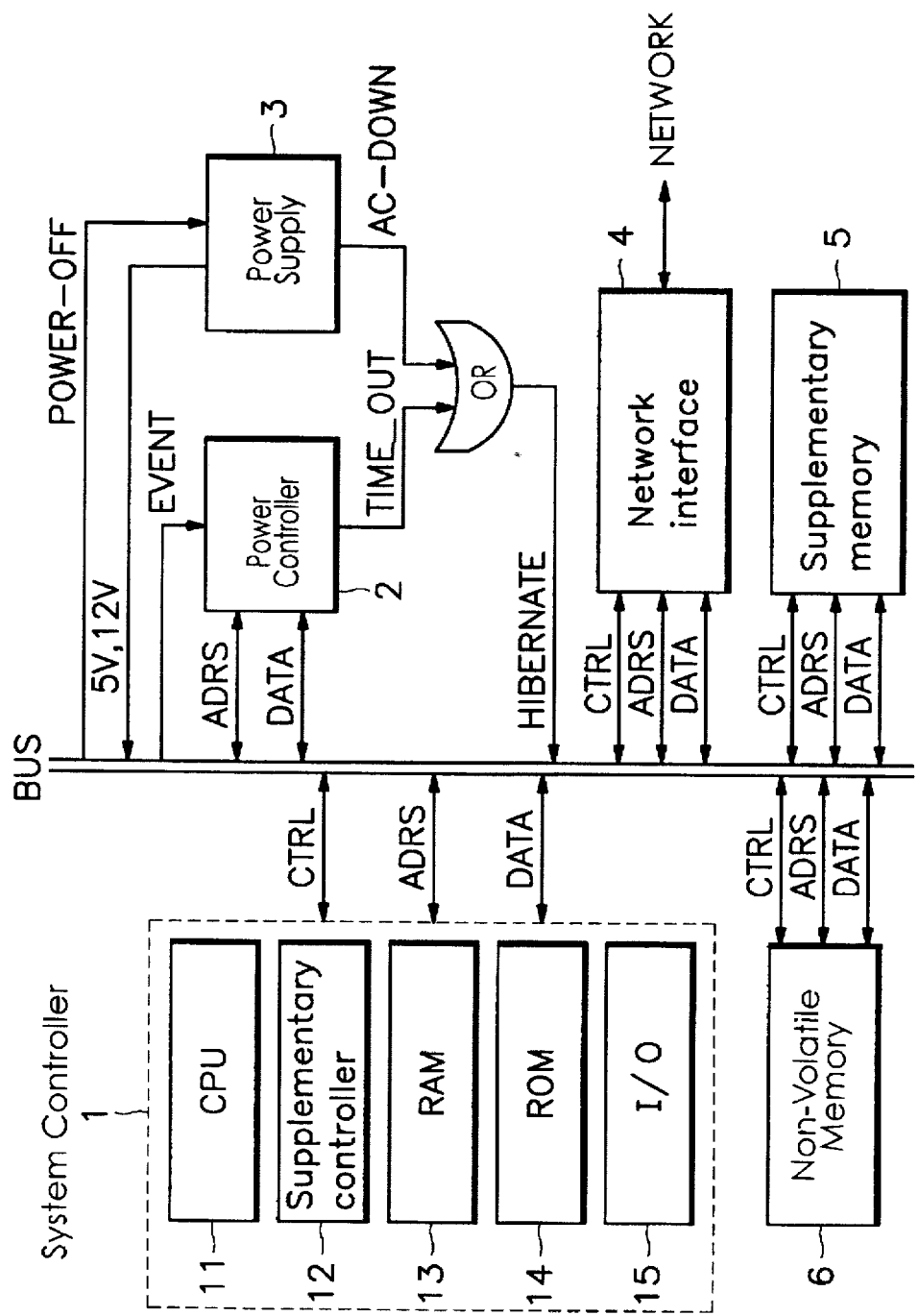
FIG. 1 is a block diagram showing the network hibernation system constructed according to the principles of the present invention to provide a preferred embodiment of the invention.

Referring now to the drawings and particularly to FIG. 1, which illustrates a network hibernation system as constructed according to the principles of the present invention. The network hibernation system includes a system controller 1 for controlling the network hibernation and controlling data back up in the event of a power failure or when a computer is in a non-use state and subsequently recovering data from the computer in a network environment; a power controller 2 for monitoring whether the computer is in a non-use period of operation and generating a TIME-OUT signal indicating that the computer is in the non-use period; a power supply 3 for backing up data of the computer in the event of a power failure and generating a AC-DOWN signal indicating that AC-power supply is abruptly interrupted because of a power failure; a network interface 4 for connecting the computer to a local area network enabling the computer to operate in the network environment; a supplementary memory 5 for storing data of the computer in the network environment when the AC-power supply is abruptly interrupted because of power failure, or alternatively, when the computer is suspended during a non-use period; and a non-volatile memory 6 for storing network hibernation information.

System controller 1 of the network hibernation system comprises a CPU (central processing unit) 11 for controlling operation of the network hibernation system, a supplementary controller 12 for supporting commands of the CPU 11, a RAM 13 for storing at least a network hibernation module, a ROM 14 for storing at least a hibernation module, and an I/O port (input/output) 15. The supplementary controller 12 typically includes a bus controller for controlling a data bus, a DMA controller for reading or writing data onto the memory from the I/O device without the CPU 11, and an interrupt controller for controlling interruption from auxiliary devices such as, keyboard, mouse, floppy disk drive and serial port to the CPU 11.

Figure 2:
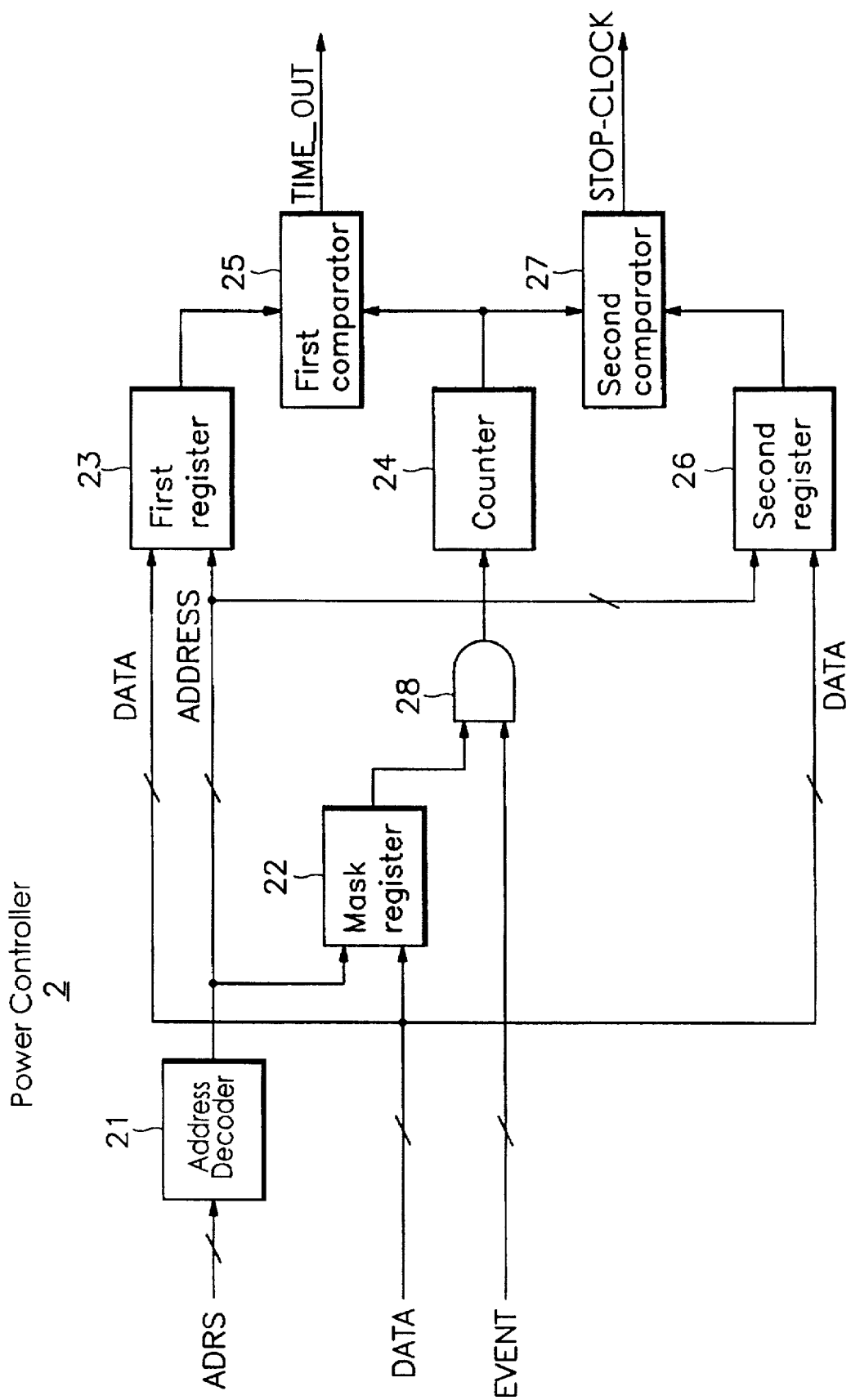
FIG. 2 is a block diagram showing the power controller of the network hibernation system constructed to provide a preferred embodiment of the invention.

FIG. 2 illustrates a power controller 2 of the network hibernation system as constructed according to the principles of the present invention. The power controller 2 comprises an address decoder 21 connected to the bus, for decoding addresses designated by the system controller 1; a mask register 22 connected to bus, for masking data provided from the system controller 1 at the addresses decoded by the address decoder 21; first and the second registers 23, 26 connected to the data bus and the address decoder 21, respectively; an AND gate 28 connected to the mask register 22 and an event signal line indicating whether the computer is in the non-use state; a counter 24 for counting an output of the AND gate 28; a first comparator 25 for comparing the output of the first register 23 and the output of the counter 24; and a second comparator 27 for comparing the output of the second register 26 and the output of the counter 24.

The power controller 2 as constructed in FIG. 2, is preferable in the practice of the present invention. However other power control arrangement may also be implemented to serve the intended function described herein. One such example is disclosed in the Korean patent application No 92-14590 for The Circuit Producing The Power Interruption Signal In The Computer Peripheral Equipment, which is incorporated herein by reference.

Figure 3:
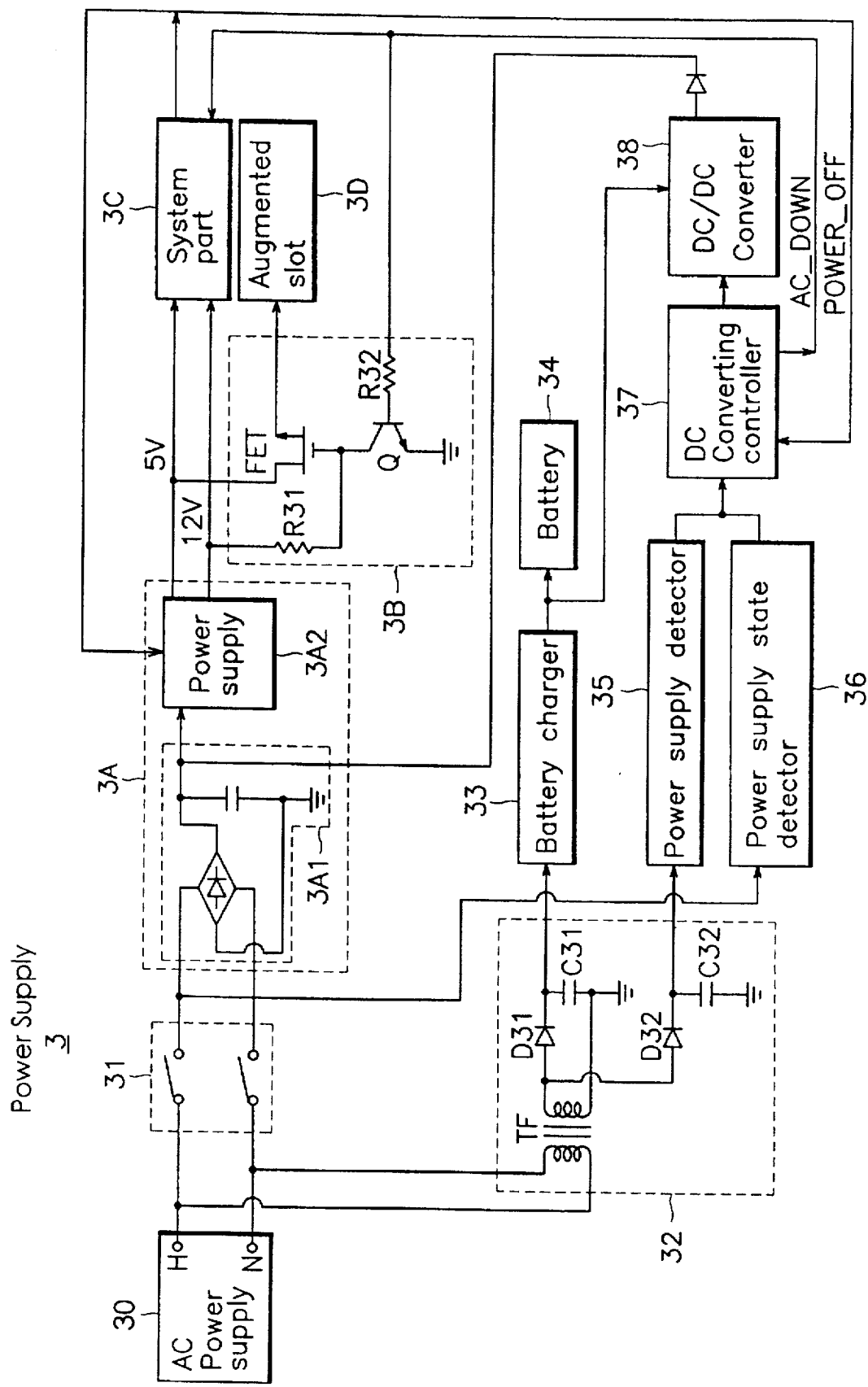
FIG. 3 is a block diagram showing the power supply for backing up of data in the hibernation system constructed to provide a preferred embodiment of the invention.

FIG. 3 illustrates a power supply 3 for providing back-up power supply to the network hibernation system as constructed according to the principles of the present invention. The power supply 3 comprises an AC (alternating current) power supply 30; a power switch 31; a linear converting rectifier 32 composed of a transformer (TF) having a primary coil connected to two output terminals of the AC-power supply 30 and a secondary coil providing parallel output terminals via diodes (D31, D32) and condensers (C31, C32); a battery 34 and a battery charger 33 connected in cascade to the linear converting rectifier 32; a power supply state detector 36 connected to the output terminal of the linear convening rectifier 32; a power supply switching state detector 36 connected to the power switch 31 for determining whether the AC power is normal; a DC (direct current) converting controller 37 connected to the output terminals of the power supply detector 35 and the power supply switching state detector 36, for generating the power supply interruption detection signal to a system part 3C in response to an abrupt termination of the power supply; a DC/DC converter 38 connected to the output terminals of the battery charger 33 and the DC converting controller 37, for providing an output DC voltage to an output terminal of the bridge rectifier 3A1 in the main power supply 3A through a diode; a main power supply 3A having the bridge rectifier 3A1 and a power supply 3A2 serially connected to an output terminal of the AC-power supply 30 through power switch 31, for supplying a 5 volts and 12 volts of DC power at respective output terminals; and an augmented slot interrupter 3B connected to the 5 volts and 12 volts of DC power and coupled to receive the power interruption detection signal.

The augmented slot interrupter 3B contains a field effect transistor FET having a drain connected to the 5 volts output terminal of the power supply 3A2 and a source connected to an augmented slot 3D, and a transistor having a collector connected to the 12 volts output terminal of the power supply 3A2 through a resistor R31 and a gate of the field effect transistor FET, and a base coupled to receive the AC-power interruption detection signal representing a back-up starting signal of the working environment from the DC converting controller 37.

While the power supply 3 for backing up data as constructed in FIG. 3 is preferable in the practice of the present invention, other power supply arrangements such as, those disclosed in the Korean patent application No. 93-31255 for The Supplementary Power Supply For Backing Up The Working Environment In An Emergency may also be implemented and is thereby incorporated by reference herein.

Figure 4:
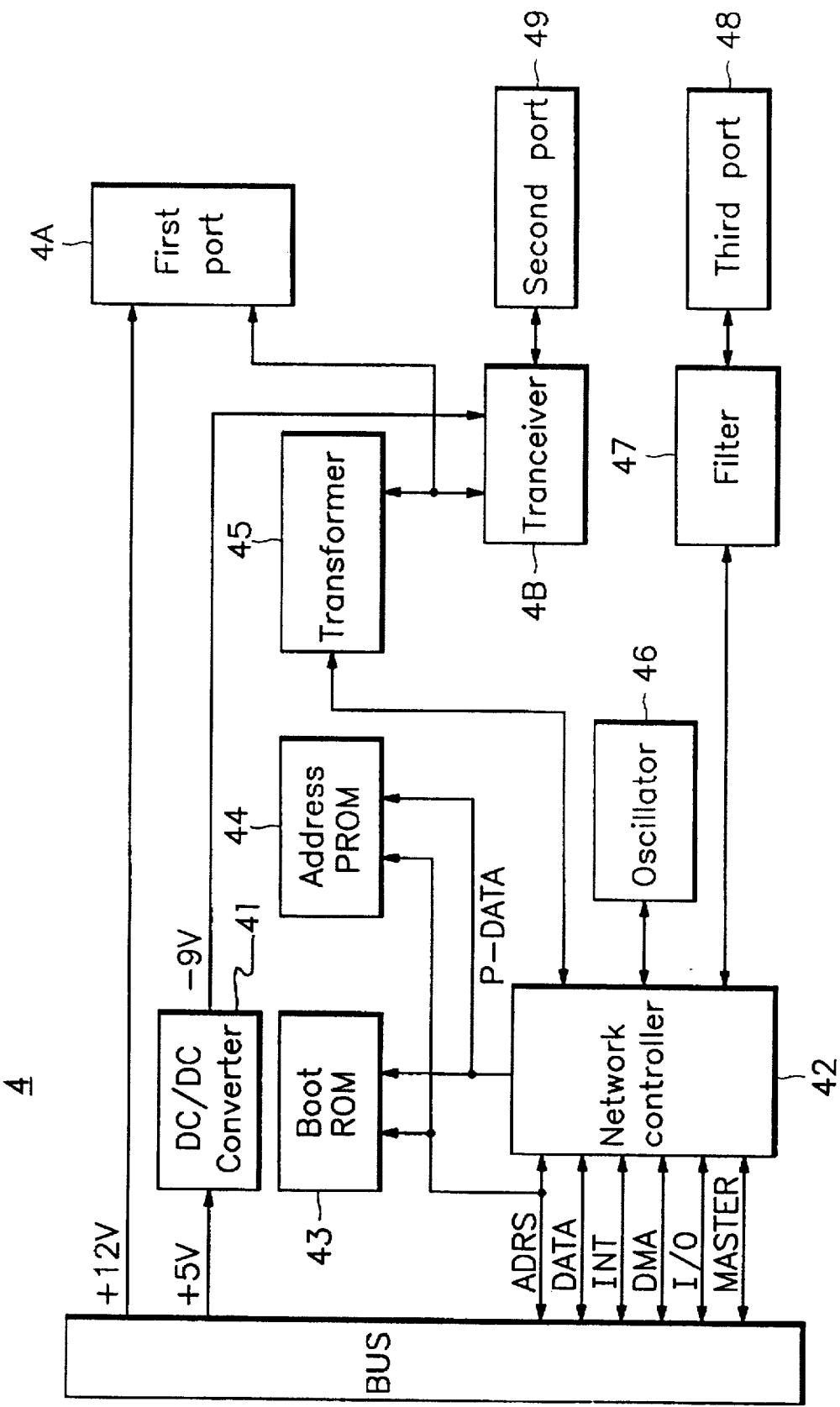
FIG. 4 is a block diagram showing the network interface in the network hibernation system constructed to provide a preferred embodiment of the invention.

FIG. 4 illustrates a network interface 4 of the network hibernation system according to an embodiment of the invention. The network interface 4 includes a network controller 42 connected to a data bus, for interfacing the computer with the local area network and enabling the computer to communicate with a local area network server; an oscillator 46 connected to the network controller 42, for generating a clock to operate the network controller; a boot ROM 43 connected to the data bus, for storing a booting program for booting the local area network server; an address PROM 44 connected to the data bus and the network controller 42, for storing addresses of the network interface 42; a DC/DC converter 41 connected to the data bus, for converting 5 volts into −9 volts; a transformer 45 connected to the network controller 42; a transceiver 4B connected to the transformer 45 and the DC/DC converter 41; a first port 4A connected to the data bus and the transformer 45; a second port 49 connected to the transceiver 4B; a third port 48 connected to the network controller 42; and a filter 47 interposed between the network controller 42 and the third port 48.

Figure 5:
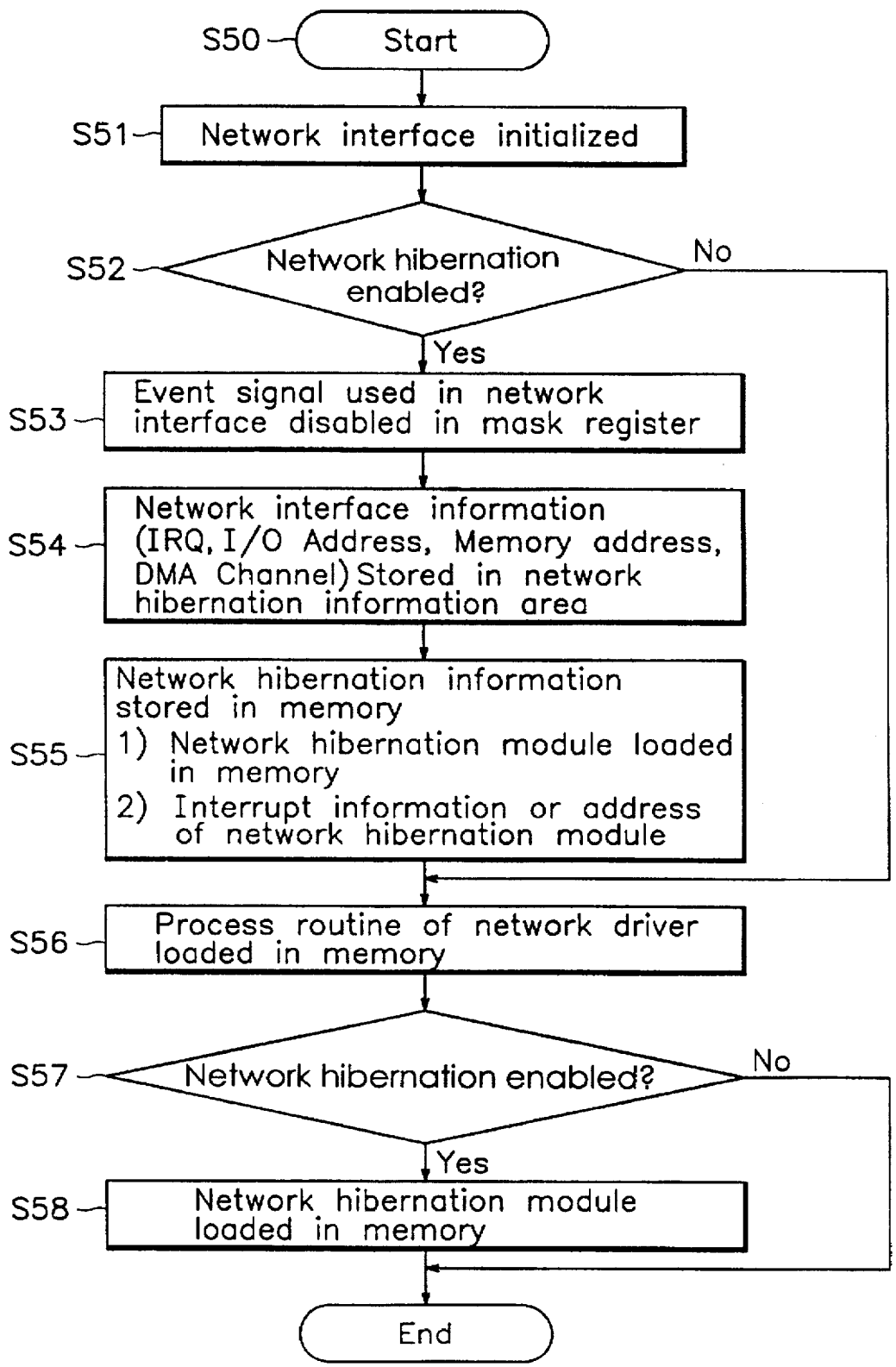
FIG. 5 is a flow chart of the loading process for the network hibernation module as performed by a preferred embodiment of the invention.

Turning now to FIG. 5 which illustrates a loading process of the network hibernation module into the RAM 13 as shown in FIG. 1. The loading of the network hibernation module starts at step S50 and proceeds to step S51 in which the network interface 4 is initialized. Once the network interface 4 is initialized, the system controller 1 determines whether the network hibernation is enabled at step S52. When the network hibernation is enabled at step S52, the system controller 1 disables the event signal in the mask register 22 as shown in FIG. 2 at step S53, and stores the information of the network interface in the network hibernation information area in the RAM 13 at step S54. The system controller 1 then loads the network hibernation module in the RAM 13 and stores interrupt information or address of the network hibernation module in the RAM 13 at step S55. The system controller 1 proceeds to load process routine of the network driver in the RAM 13 step S56, determines whether the network hibernation is enabled again at step S57, and loads the network hibernation module in the RAM 13 if the network hibernation is enabled at step S57.

If, on the other hand, the network hibernation is not enabled at step S52, the system controller 1 bypasses steps S53, S54, S55 and proceeds directly to step S56 to load process routine of the network driver in the RAM 13. Similarly, if the network hibernation is not enabled at step S57, the system controller 1 bypasses step S58 and terminates the loading process.

Figure 6:
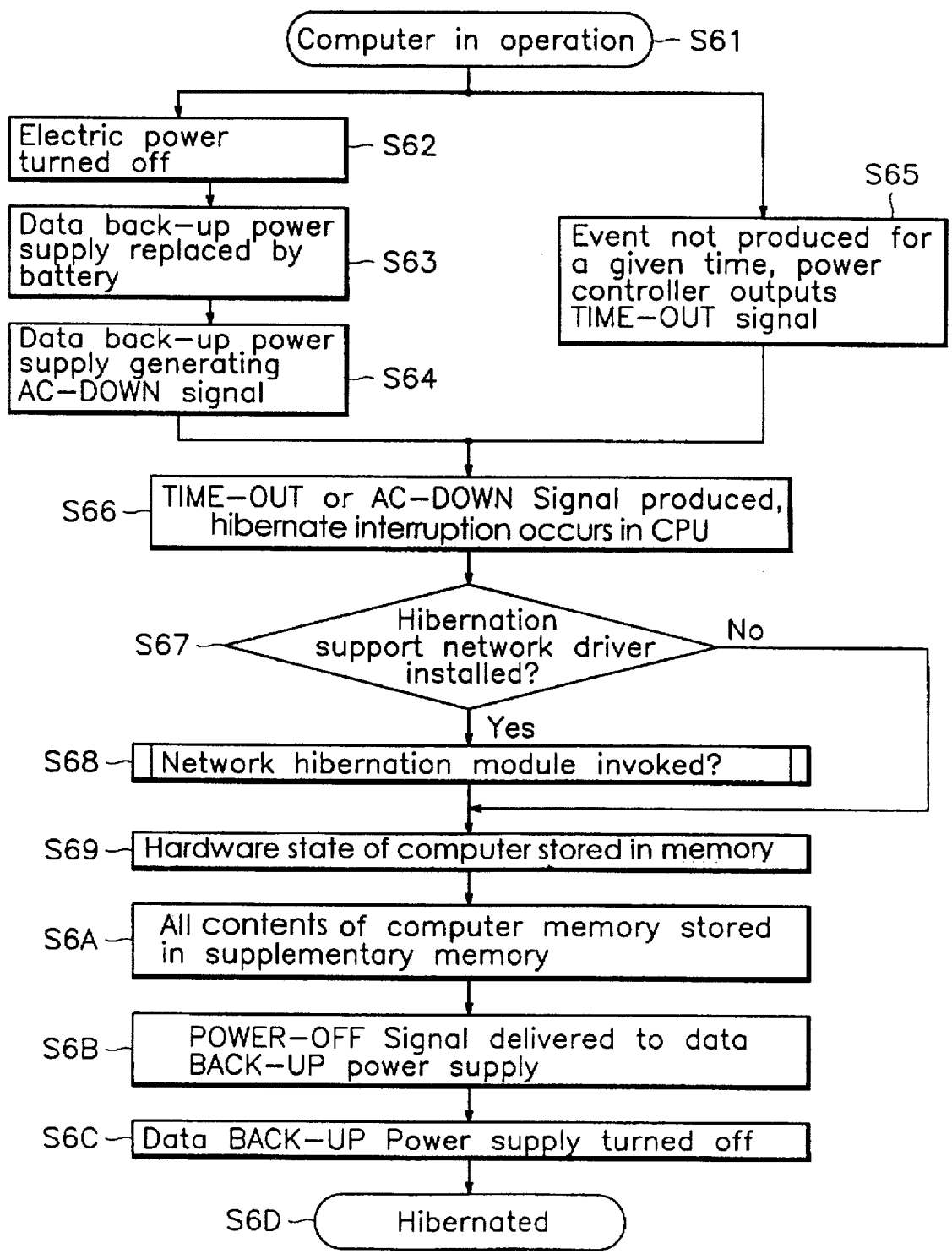
FIG. 6 is a flow chart of the suspend process for the hibernation module as performed by a preferred embodiment of the invention.

FIG. 6 illustrates a suspension or hibernation process of a hibernation module of the ROM 14 as shown in FIG. 1, in which the computer is suspended of operation after data of the computer in the network environment are stored in a memory upon detection of either a power failure or a period of non-use during operation. As shown in FIG. 6, the suspension process as contemplated by the present invention first requires the computer to be in operation at step S61. If the electric power or AC-power is turned off because of a power failure or a mistake made by a user at step S62, back-up power supply from a battery is provided to back-up data of the computer in the network environment at step S63, and an AC-DOWN signal indicating that the AC-power supply is abruptly interrupted because of a power failure is generated by the power supply 3 as shown in FIG. 1 at step S64.

If, on the other hand, an event does not occur in the computer for a given time indicating that the computer is in a non-use state, a TIME-OUT signal is generated by the power controller 2 as shown in FIG. 1 at step S65. The system controller 1 responds to a hibernate interruption when either a TIME-OUT signal or a AC-DOWN signal is generated at step S66, and proceeds to determine whether a hibernation support network driver is installed in the system at step S67. If the hibernation support network driver is installed in the system at step S67, the system controller 1 invokes the network hibernation module at step S68 to store all the hardware states of the computer in its memory at step S69. If, on the other hand, the hibernation support network driver is not installed in the system at step S67, the system controller 1 bypasses step S68 and proceeds to store all the hardware states of the computer in its memory at step S69 directly. When all the hardware states of the computer are stored in the memory at step S69, the system controller 1 stores all contents of computer memory in a supplemental memory 5 as shown in FIG. 1 at step S6A. After all the contents of computer memory are stored in the supplemental memory 5, the system controller 1 generates a POWER-OFF signal indicating that all contents of computer memory have been stored in the supplemental memory 5 or data of the computer in the network environment has been backed-up, to the data back-up power supply of the power supply 3 at step S6B in order to cut off the data back-up power supply at step S6C and then maintain in hibernation at step S6D.

Figure 7:
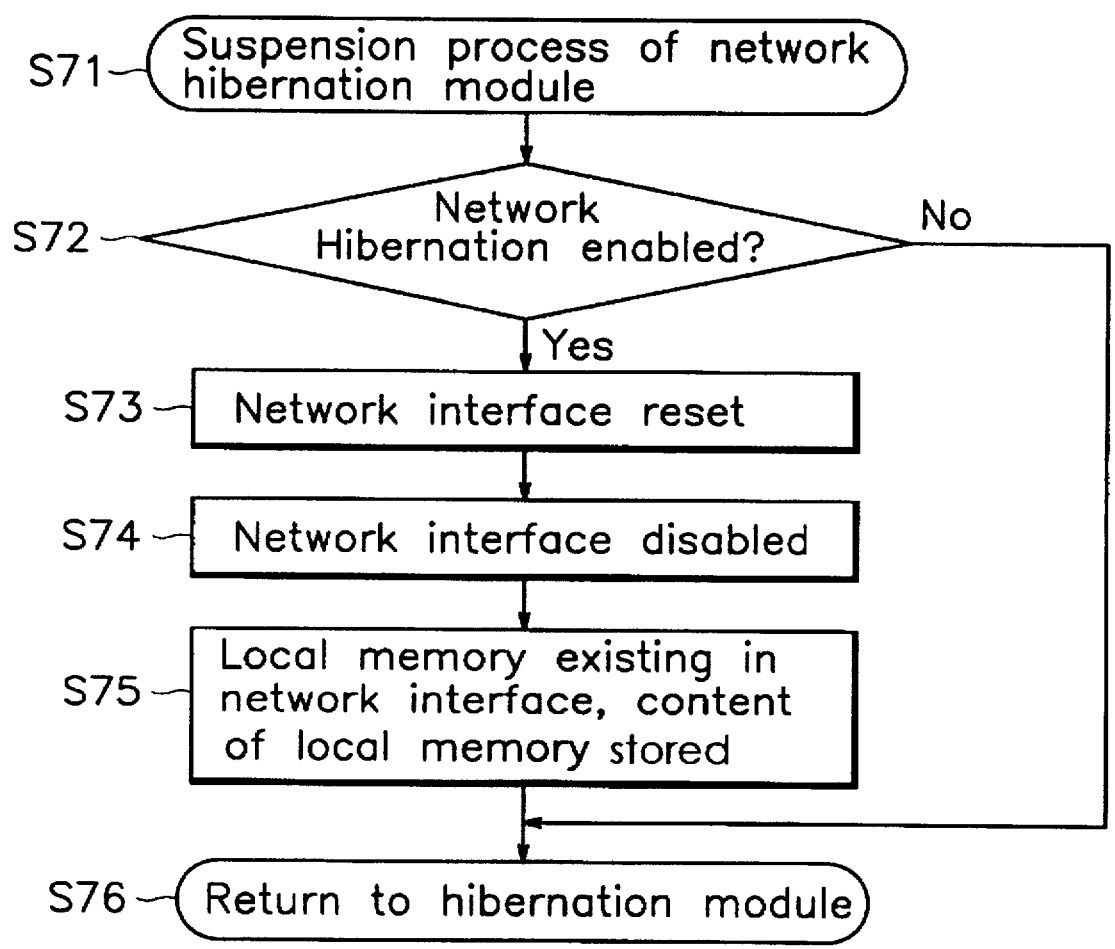
FIG. 7 is a flow chart of the suspend process for the network hibernation module as performed by a preferred embodiment of the invention.

FIG. 7 illustrates a suspension process of a network hibernation module of the RAM 13 of FIG. 1, in which the system controller 1 invokes the network hibernation module at step S71, and determines whether the network hibernation is enabled at step S72. If the network hibernation is determined as being enabled at step S72, the system controller 1 resets the network interface 4 at step S73 and then disables the network interface at step S74. After the network interface 4 is disabled at step S74, the system controller 1 determines whether there is a local memory in the network interface 4; if the local memory exists in the network interface 4, the system controller stores all the contents of the local memory in its memory at step S75 and returns to the hibernation module at step S76.

Figure 8:
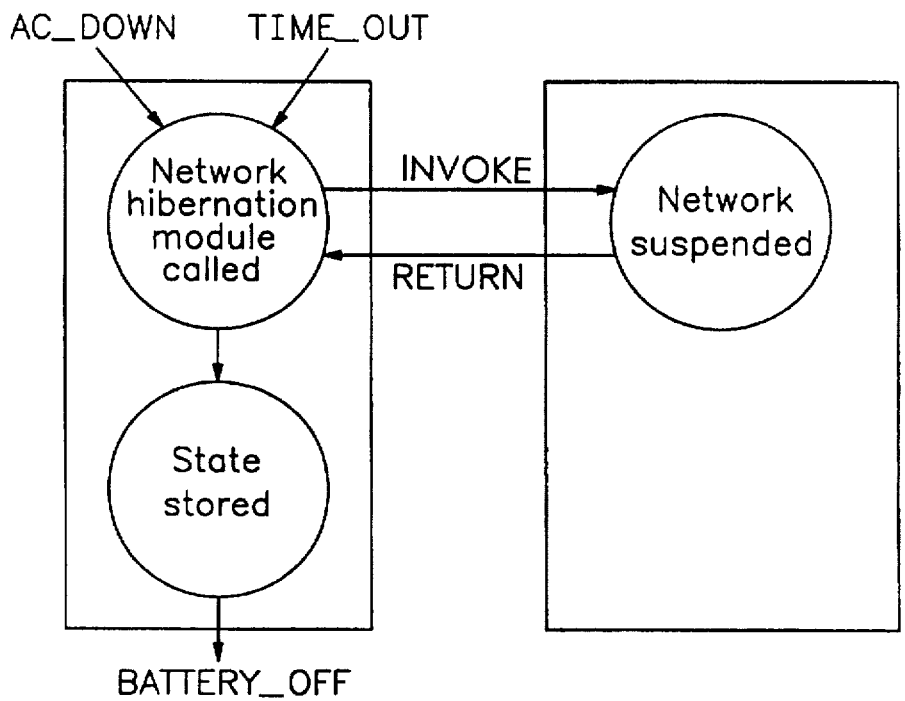
FIG. 8 illustrates the state in which the network hibernation module is invoked during power-off.

FIG. 8 illustrates an invocation of the network hibernation module of the RAM 13 of FIG. 1 in case of power-off, that is, upon detection of either a AC-DOWN signal or a TIME-OUT signal indicating that AC-power is cut off because of either a power failure or detection of a non-use state during operation. When the system controller receives either a TIME-OUT signal from the power controller 2 indicating that the computer is in the non-use period or a AC-DOWN signal from the power supply 3 indicating that AC-power supply is abruptly interrupted because of a power failure, the hibernation module of the ROM 14 as shown in FIG. 1 reads the network hibernation information such as the network hibernation interrupt and network hibernation address stored in the non-volatile memory 6 to call the network hibernation module of the RAM 13 in order to suspend operation of the computer in the network environment.

For example, if the hibernation module of the ROM 14 of FIG. 1 reads the network hibernation interrupt stored in the non-volatile memory 6, it detects starting address from an interrupt vector table of the network hibernation module of the RAM 13 and transfers control data to the network hibernation module of the RAM 13. If the hibernation module of the ROM 14 of FIG. 1, on the other hand, reads the network hibernation address stored in the non-volatile memory 6, it relies upon such address data to locate corresponding address of the network hibernation module for suspending operation of the computer in the network environment.

Figure 9:
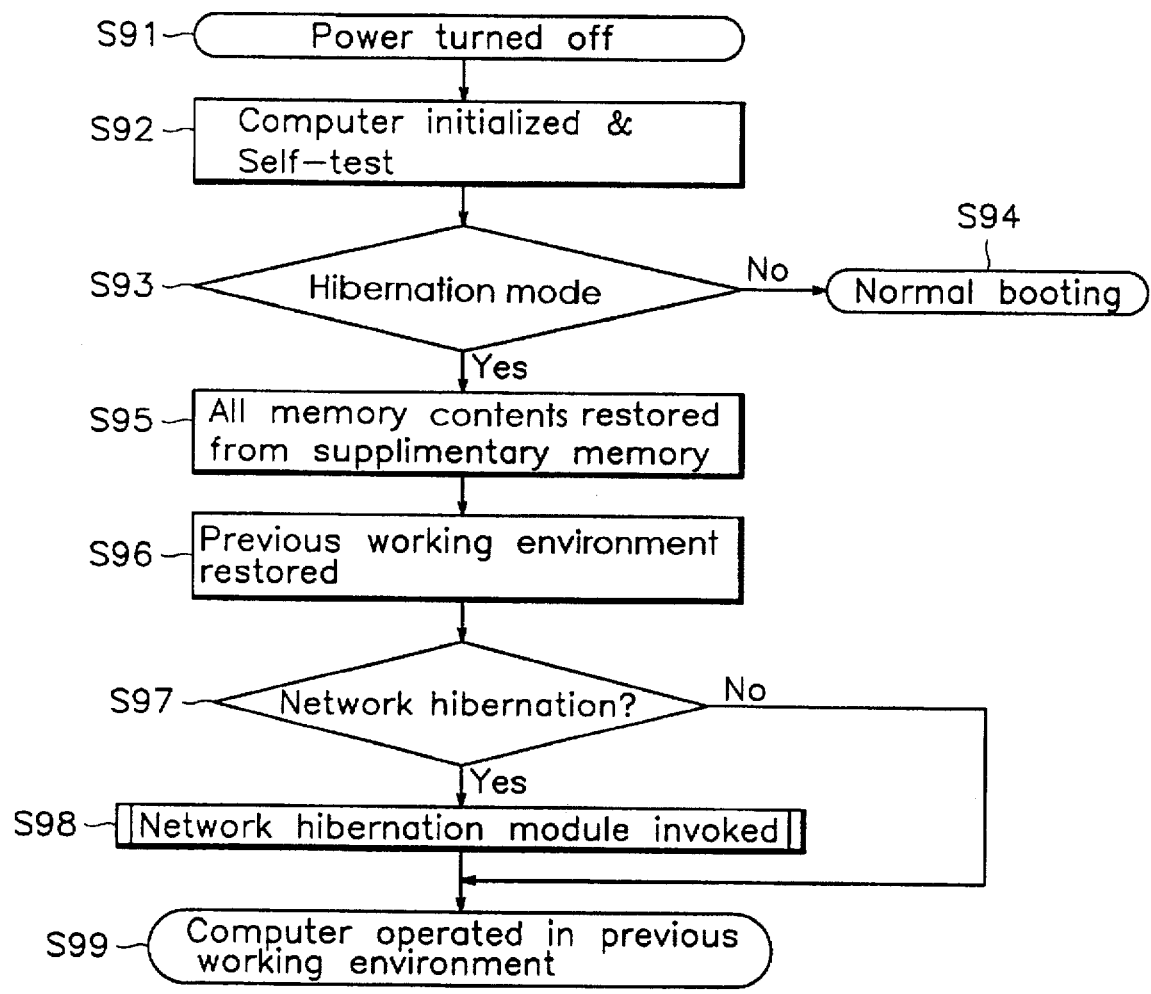
FIG. 9 is a flow chart showing the resume process of the hibernation module.

Turning now to FIG. 9, which illustrates a resuming process of the hibernation module of the ROM 14 according to an embodiment of the invention for recovering data of the computer stored in the supplemental memory 5 and restore the computer to a former state before detection of either a power failure or a period of extended non-use during operation of the computer. After the power supply turned off for a period at step S91, the system controller 1 initializes and self-examines the computer when the power is re-supplied to the computer at step S92. The system controller 1 then determines whether the computer is in the hibernation mode at step S93. If the computer is in the hibernation mode at step S93, the system controller 1 proceeds to recover all data stored in the supplementary memory 5 at step S95 and restores the computer to a previous working environment before detection of either a power failure or a period of extended non-use during operation of the computer at step S96. If, on the other hand, the computer is not in the hibernation mode at step S93, the system controller 1 conducts a complete normal booting process at step S94. After the working environment of the computer is restored at step S96, the system controller 1 determines whether the system is in a network hibernation state at step S97. If the system is in the network hibernation state at step S97, the system controller 1 invokes the network hibernation module of the RAM 13 at step S98 for enabling the computer to operate in a former working environment before hibernation at step S99. If, on the other hand, the system is not in the network hibernation state at step S97, the system controller 1 bypasses step S98 and directly enables the computer to operate in its former working environment before hibernation.

Figure 10:
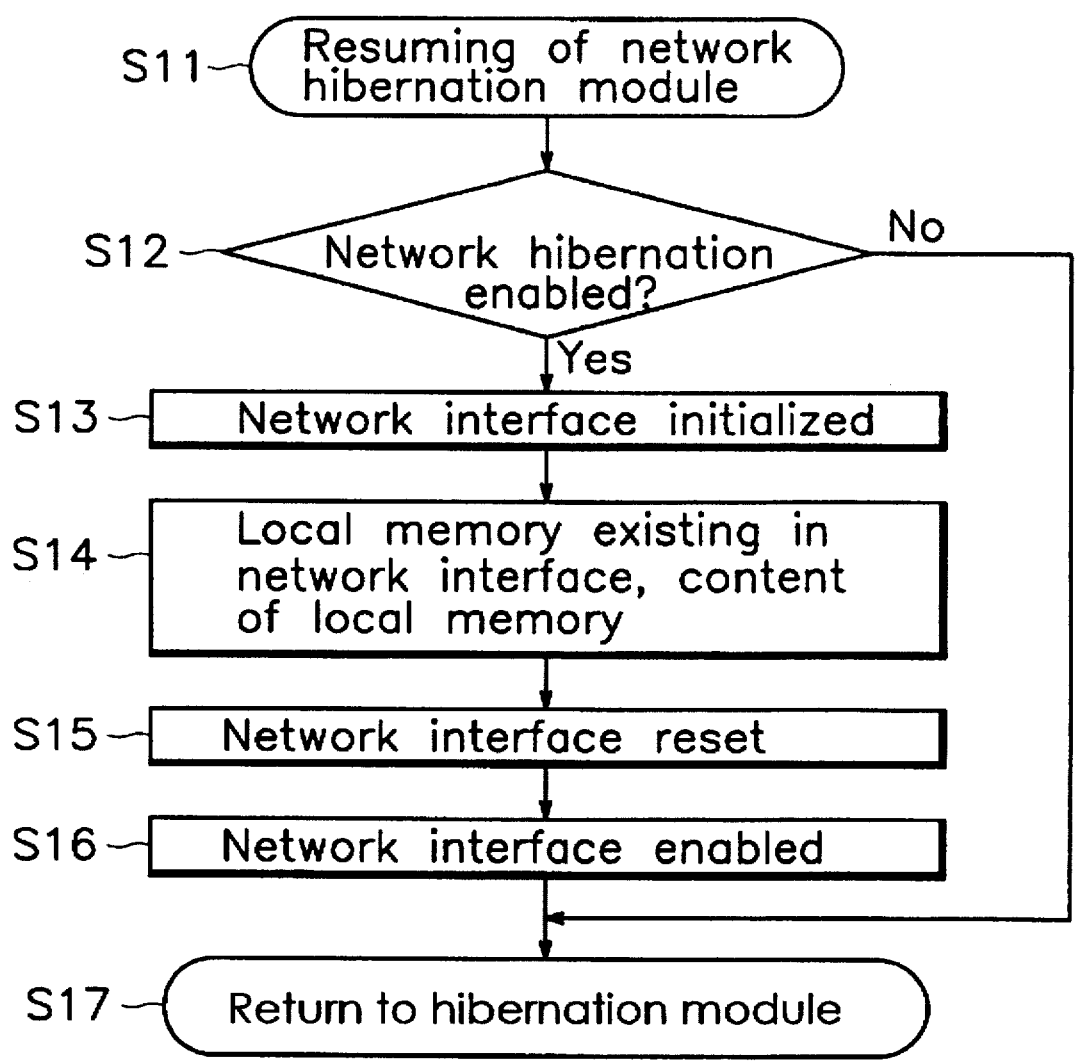
FIG. 10 is a flow chart showing the resume process of the network hibernation module.

FIG. 10 illustrates a resuming process of a network hibernation module of the RAM 13 of FIG. 1, in which the system controller 1 invokes the network hibernation module at step S11, and determines whether the network hibernation is enabled at step S12. If the network hibernation is enabled at step S12, the system controller 1 initializes the network interface 4, determines whether there is a local memory in the network interface 4; if the local memory exists in the network interface 4, the system controller recovers all the contents stored in the local memory at step S14. After recovering all the contents stored in the local memory at step S14, the system controller 1 resets the network interface 4 at step S15, enables the network interface at step S16, and then returns to the hibernation module at step S17 after the network interface has been enabled at step S16. If, the network hibernation is not enabled at step S12, the system controller 1 bypasses steps S13, S14, S15, S16 and returns directly to the hibernation module at step S17.

Figure 11:
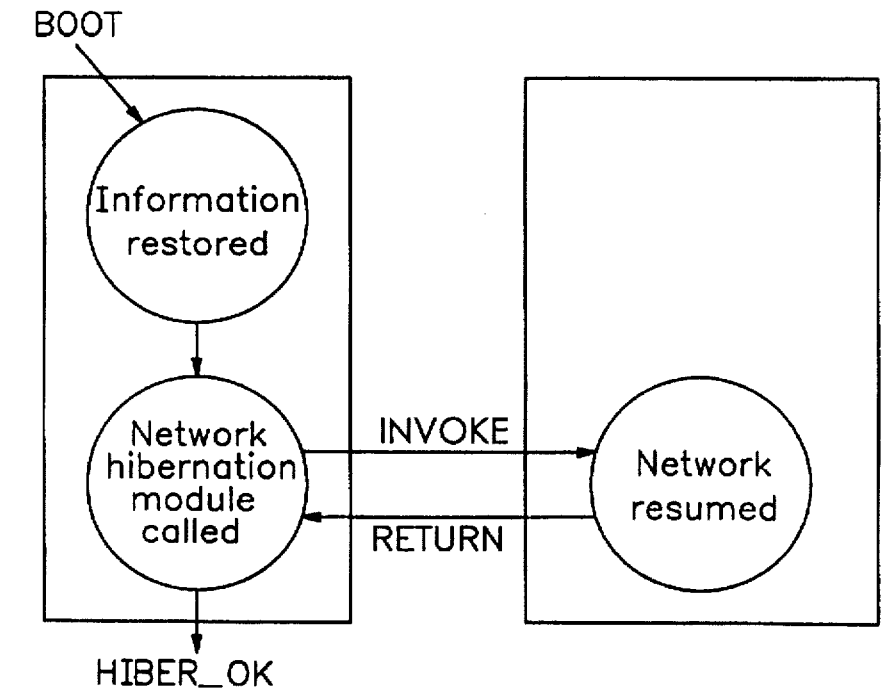
FIG. 11 illustrates the state in which the network hibernation module is invoked during booting.

FIG. 11 illustrates an invocation of the network hibernation module of the RAM 13 of FIG. 1 in case of booting, that is, when the computer is not in a hibernation mode. The hibernation module of the ROM 14 as shown in FIG. 1 reads the network hibernation information such the network hibernation interrupt and network hibernation address stored in the non-volatile memory 6 to call the network hibernation module of the RAM 13 in order to determine whether the computer requires a booting process.

Figure 12:
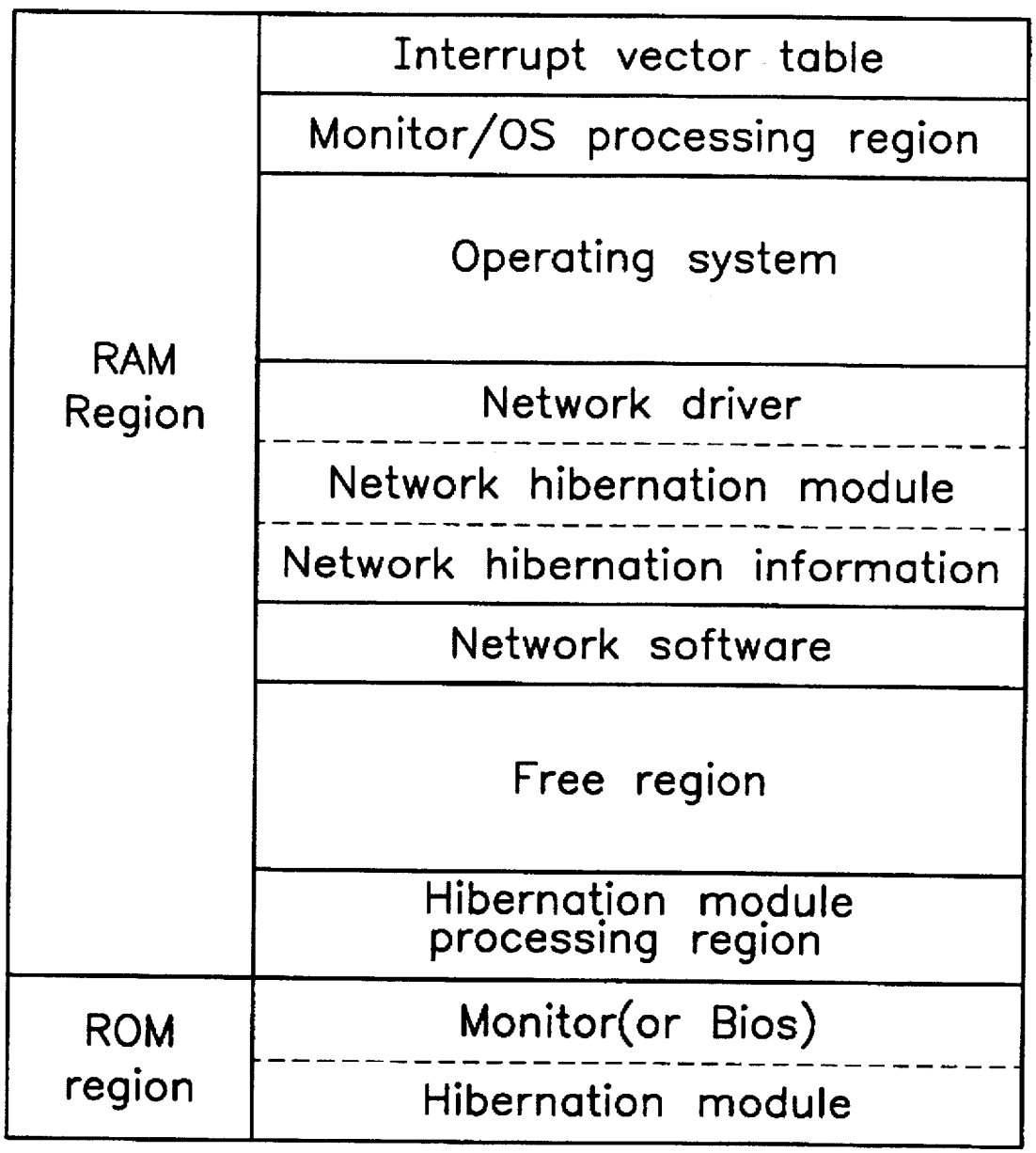
FIG. 12 illustrates the memory map of RAM and ROM in the network hibernation system constructed according to the principles of the invention.

FIG. 12 illustrates a memory map of the RAM 13 and ROM 14 in the network hibernation system according to the embodiment of the invention. As shown in FIG. 12, the RAM 13 contains an interrupt vector table region, a monitor/OS processing region, an operating system region, a network driver region, a network hibernation module region, a network hibernation information region, a network software region, a free space region, and a hibernation module processing region.

The interrupt vector table stores address data of specific commands to be processed by the CPU 11 of the system controller 1. The monitor/OS processing region stores data used by a monitor or Basic Input/Output Software (BIOS) for operating the system. The operating system region stores software for memory management, I/O device management, process management such as, for example, MS-DOS. The network driver region processes an interface between the hardware network interface as shown in FIG. 4 and the software network interface. The network hibernation module or the network hibernation information may be included in the network driver. The network hibernation module region stores the network hibernation module for implementing the suspension process of FIG. 7 and resuming process of FIG. 10. The network hibernation information region contains configuration data for the network interface hardware in step S54 of FIG. 5, steps S73 of FIG. 7, and S13, S15, S16 of FIG. 10. The network software region communicates with the LAN server for transmitting and receiving files. The free region reserves loading space for user application software. The hibernation module processing region memorizes data needed to resume operation of the computer after suspension, and parameter values needed to invoke the network hibernation module in case of power-off and booting as shown in FIGS. 8 and 11.

ROM 14, on the other hand, contains a monitor (or BIOS) region and a hibernation module region. When the computer is turned-on, the monitor performs a power-on self-test, initializes the hardware components and loads the operation system from the auxiliary memory to the RAM 13 using software stored in the monitor (or BIOS) region. The hibernation module region stores a hibernation module for implementing the suspension process of FIG. 6 and the resuming process of FIG. 9. The hibernation module contains a suspend module and a resume module. The suspend module contains a group of word commands for processing steps, such as S67, S95, S96, S97 and S98 of FIG. 6. Similarly, the resume module contains a group of word commands for processing steps, such as S93, S95, S96, S97 and S98 of FIG. 9.

Figure 13:
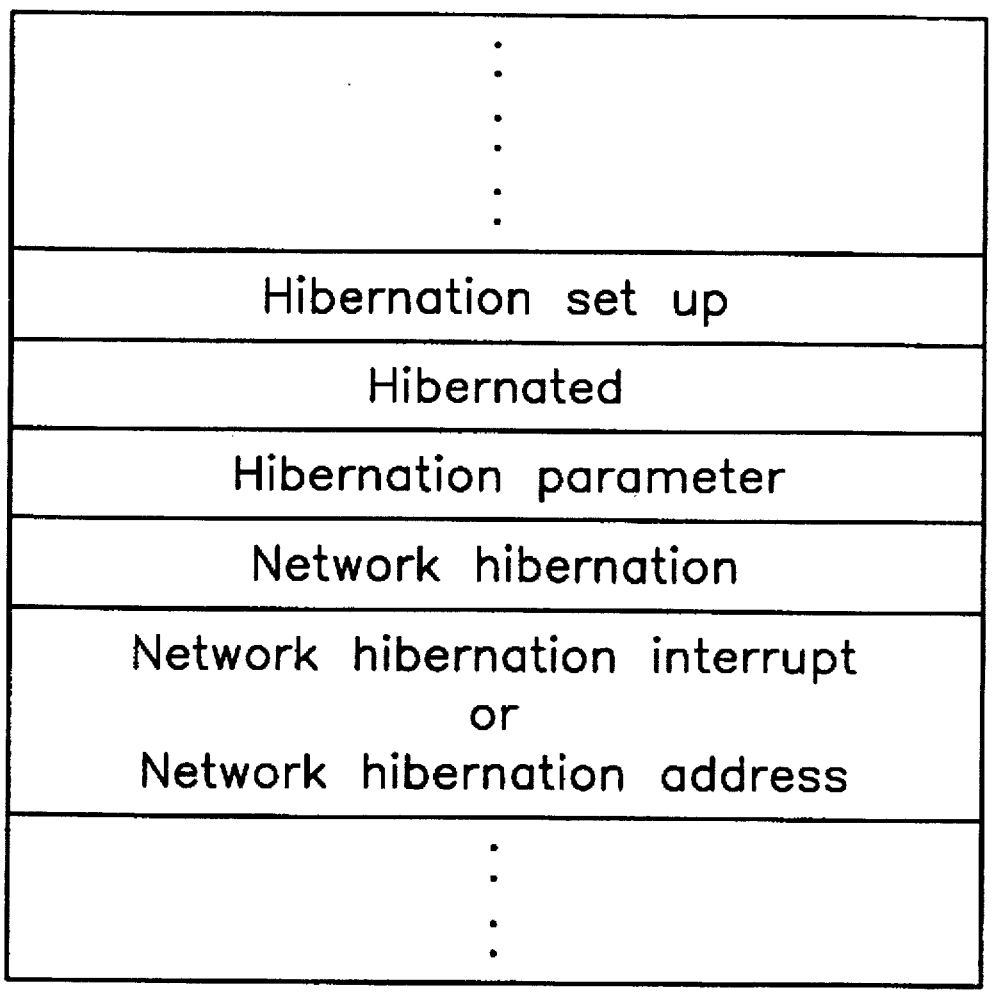
FIG. 13 illustrates the memory map of the non-volatile memory in the network hibernation system constructed according to the principles of the invention.

FIG. 13 illustrates a memory map of the non-volatile memory 6 of the network hibernation system according to an embodiment of the invention. The non-volatile memory 6 stores hibernation data for processing the hibernation module and the network hibernation module. As shown in FIG. 13, the non-volatile memory 6 comprises a hibernation setting up region, a hibernation state region, a hibernation parameter region, a network hibernation region, and a network hibernation interrupt or a network hibernation address region. The hibernation setting-up region contain a hibernation flag of a binary bit of "1" and "0" for use in the hibernation module for supporting or preventing the hibernation function. A hibernation flag of "1" indicates a hibernation supporting mode, whereas the hibernation flag of "0" indicates a hibernation preventing mode. The hibernation state region memorizes data indicating whether the computer is in a hibernation mode as described in step S93 of FIG. 9. The hibernation parameter region memorizes data of the supplementary memory 6 in a suspension mode such as, for example, head #, cylinder #, and sector # of the HDD for use in steps as S6A of FIG. 6, S75 of FIG. 7, S95 of FIG. 10, and S14 of FIG. 10. The network hibernation region contains data stored tentatively by the network hibernation, suspend state data, resume state data used for transferring the parameter values when the system controller 1 invokes the network hibernation module in FIGS. 8 and 11. Installed data from the loading of the network hibernation module in the RAM 13 in step S67 of FIG. 6 may also be included in the network hibernation region. The network hibernation interrupt mode region stores the number of corresponding interrupts in the hibernation module when the system controller 1 invokes the network hibernation module; and the network hibernation address mode region stores address data in which the network hibernation module is positioned.

When the computer operates with its power on and the network hibernation system according to an embodiment of the invention operates by loading the network hibernation module with network driver module into the system memory. The loading of the network hibernation module into the memory as shown in FIG. 5 is explained in detail as follows.

First, the CPU 11 in the system controller 1 initializes the network interface and self-examines. Then, the CPU 11 determines whether the network hibernation is enabled by checking the status of the hibernation install flag in the nonvolatile memory 6. If the network hibernation is enabled, CPU 11 in the controller 1 disables the corresponding flag in the mask register 22 shown in FIG. 3 to disable the event signal used in the network interface 4. The reason for disabling the event signal is twofold. First, data is received continuously through the network interface 4 from the LAN server when the computer is connected to the LAN even though the network may not be in use. Second, since the network interface 4 produces interruption unconditionally at the time that data is received, the power controller 2 may misinterpret the computer to be operated even though the computer is not in use.

Accordingly, the power can be interrupted automatically when the computer is not in use for some-time only after the network interface 4 disables the corresponding interruption (that is to say, the corresponding event signal) by using the mask register 22 as shown in FIG. 3. After the event signal is disabled, CPU 11 of the system controller 1 stores the corresponding information such as the interrupt signal used in the network interface, the I/O address, the direct memory access, the memory information, etc. on the network hibernation region of the RAM region shown in FIG. 12. Next, CPU 11 of the system controller 1 stores information relating to the network hibernation on the nonvolatile memory 6.

At this time, the network hibernation interrupt vector should be added to or be changed in the interrupt vector table shown in FIG. 12 when the network hibernation is used. The CPU 11 of the system controller 1 terminates after the network driver module and the network hibernation module are installed in the system memory.

As described above, the suspend processes S67 and S68 of the hibernation module of FIG. 6 are performed by installing the network hibernation module on the memory if the electric power is cut off due to a power failure or a suspension when the computer is not in use for sometime while the system controller 1 operates as a computer after the network hibernation system starts its operation.

If the power supply is interrupted during operation due to the abrupt interruption of electric power, the power supply 3 for backing up of data generates an AC-DOWN signal or a power interruption detection signal indicating that AC-power supply is abruptly interrupted because of a power failure after back-up power supply is supplied to the system by a battery.

When the electric power is interrupted because of a power failure, the overall operation of the power supply 3 for backing up of data which produces the AC power interruption detection signal while the back-up power supply is applied to the system by the battery is as follows:

If the power is applied to the power switch 31 and the linear converting rectifier 32 from the AC power supply 30, the power supply 3 for backing up of data starts its operation. The operation can be classified in four situations: (A) when the power supply is applied from the AC-power supply 30 and the power switch 31 is turned on; (B) when the power supply is applied from the AC-power supply 30 and the power switch 31 is turned off; (C) when the power supply from the AC-power supply 30 is not applied from the AC-power supply 30 and the power switch 31 is turned-on; and (D) when the power supply from the AC-power supply 30 is cut off and the power switch 31 is turned on.

(A) When the power supply is applied from the AC-power supply 30 and the power switch 31 is turned on. In this case, AC power which is supplied from the AC power supply 30 is supplied to the main power supply 3A through the power switch 39 and the power supply 3A2 generates DC power of 5 volts and 12 volts after the AC power is rectified by the bridge rectifier 3A1 in the main power supply 3A.

The DC power is supplied to the augmented slot 3D in which expanded cards such as, example, 3C, video card, music card, fax/modem card, etc. are provided for enabling the computer to operate in the network environment. In addition, the AC power supplied from the AC power supply 30 is also rectified to DC power by the diodes D31, D32 and the condensers C31, C32 after the voltage is decreased by the transformer TF in the linear converting rectifier 32. The DC power of the linear converting rectifier 32 is then supplied to the battery charger 33 so that the battery may be charged and a low level signal is outputted to the expanded slot interruptor 3B from the DC/DC converter 38 under control of the DC converting controller 37 if the power supply state detector 35 determines the state of the AC power as being normal. If the low level signal is inputted from the DC/DC converter 38, the transistor Q in the expanded slot interruptor 3B is turned off and the FET is turned on, and thus DC power of 5 volts is supplied from the power supply 3A2 to the augmented slot 3D.

(B) When the power supply is applied from the AC-power supply 30 and the power switch 31 is turned off. If the power switch 31 is turned off by the user so that the power supply from the AC-power supply 30 is cut off, the main power supply 3A does not operate. Also, the AC power of the AC power supply 30 is rectified to DC power by the linear converting rectifier 32, and the rectified DC power is supplied to the battery charger 34 and thus the battery is charged. If the power supply state detector 35 determines the state of the AC power as being normal, the power does not discharge from the battery 34 by halting the operation of DC/DC converter 38. (C) When the power supply is not applied from the AC-power supply 30 and the power switch 31 is turned-on. In this case as the case that the AC power supply 30 is turned off by the abrupt interruption of electric power or any mistake made by the user during the operation of the computer, the main power supply 3A and the linear converting rectifier 32 cease to operate, and thus the power applied to the system 3C and the extended slot 3D may be attenuated gradually. Also, because the linear converting rectifier 32 does not produce DC power, the battery charger 33 stops its operation.

At this time the power supply state detector 4 determines the AC power as being normal and the power switch state detector 5 determines the power switch 39 is being turned on, and thus the DC converting controller 37 generates a control signal to operate DC/DC converter 38.

At the same time the DC converting controller 37 outputs an AC power interruption detection signal to the system part 3C. The system part 3C constructed according to the principles of the invention means all composition except the power supply 3 for backing up data as shown data in FIG. 1. If the control signal of the DC converting controller 37 is input to the DC/DC converter 38, the DC power charged in the battery 34 is convened to DC power through the DC/DC power converter 38, and is thereafter supplied to the output terminal of the bridge rectifier 3A1 of the main power supply 3A through the two diodes.

As shown in FIG. 3, the power supply 3A2 in the main power supply 3A operates in response to DC power supplied from the DC/DC converter 38, and thus the attenuated output power of the power supply 3A2 increases again. Accordingly, the working environment can be backed up by the AC power interruption detection signal inputted from DC converting controller 37 and the DC power of 5 volts and 12 volts supplied from the power supply 3A2, in the system part 3C. Because the power charged in the battery 34 is not sufficient to operate the total system including the augmented slot 3D, the transistor Q is turned on and the FET is turned off in the augmented slot interruptor 3B by the AC power interruption detection signal so as to prevent the 5 volts DC power of the power supply 3A2, from being supplied to the extended slot 3D.

(D) When the power supply is not applied from the AC-power supply 30 and the power switch 31 is turned off.

In this case, because the AC power supply 30 is not connected and also the power switch 39 is turned off, the main power supply 3A and the linear converting rectifier 32 do not operate. The power controller 2 generates a TIME-OUT signal indicating that the computer is in an extended period of non-use.

The constitution of the power controller 2 is now explained with reference to FIG. 2 as follows. The address decoder 21 decodes address to designate each register 22, 23, 26 from an address signal (ADRS) inputted from the address bus. The mask register 22 and the first and second time register 23, 26 are selected by the address signal inputted from the address decoder 21, and at the time of setting up, the initial value is set up which is always outputted. In the mask register 22, the information which can mask the event signal is set up and in the first and second time registers, a reference time value is set up. The counter 24 is reset as "0" when the logic product of the event signal and the content of the mask register 22 is "1" in the AND gate 28, that is, interrupt signal is input from the peripheral equipment. This interrupt signal represents an "event" occurring from one of interrupt signals such as a keyboard interrupt, serial port interrupt, PS/2 mouse interrupt, fixed disk controller interrupt, and network interface interrupt indicating activity of the computer during the extended period of non-use.

If the logic product of the event signal and the content of the mask register 22 is "0" in the AND gate 28, that is, the interrupt signal is not input from the peripheral equipment or the interrupt signal masked in the mask register 22 is input from the peripheral equipment, the counter 24 keeps on counting. If the value of the counter 24 is the same as the value of the first time register 23, that is, the interrupt signal that is not masked in the mask register 22 is not input from the peripheral equipment during the reference time, the first comparator 25 outputs the TIME-OUT signal.

As shown in the above, the AC power interruption detection signal outputted from the power supply 3 for backing up of data, and the TIME-OUT signal outputted from the power controller 2 are input to the CPU 11 of the system controller 1 through the OR gate and the system bus as the interrupt signal.

If the interrupt signal is input, the CPU 1 of the system controller 1 determines that the hibernation supporting network driver is installed and, in case that the hibernation supporting network driver is installed, invokes the suspend process of the network hibernation module as shown in FIG. 8.

If the suspend process of the network hibernation module is invoked, the suspend processes (S71–S76) of the network hibernation module are performed as shown in FIG. 7. At first, the CPU 11 of the system controller 1 determines that the network hibernation is enabled by checking the status of the hibernation install flag of the nonvolatile memory 6. In case the network hibernation is enabled when the hibernation install flag has a binary bit of "1", the CPU 11 of the system controller 1 resets the network interface 4 and thereafter, disables the network interface 4. In this step, if the local memory remains in the network interface, its content is stored.

After the suspend process of the network hibernation module is performed, the computer returns to the hibernation module. In case the hibernation supporting network driver is not installed in this step, or the computer returns from the suspend process of the network hibernation module as shown above, the CPU 11 of the system controller 1 stores the present hardware state of the computer in the RAM 13 and then, all the contents of the memory in the present computer are stored in the supplementary memory 5. Next, the CPU 11 of the system controller 11 outputs the power interrupt signal to the power supply 3 for backing up of data. If the power interrupt signal is inputted, the power supply 3 for backing up of data interrupts the power of the battery 34 and power supply 3A2 and makes the computer go into the hibernation state.

As shown in the above, the operation of the power supply 3 for backing up of data which interrupts the battery power in case the power interrupt signal is input can be explained with reference to FIG. 3 as follows:

If the power interrupt signal is input after the backing up of the working environment is terminated, the DC converting controller 37 stops the operation of the DC/DC converter. And thus, because the power of the battery 34 is cut off, the 5 volts and 12 volts DC power may not be supplied. Also, if the power interrupt signal is input to the power supply 3A2, the application of power is interrupted by the interruption of the power supply 3A2. If, on the other hand, the power is applied again or data is input by the user in the hibernation state in which the power of the computer is turned off, the resume processes S93–S99 of the hibernation module shown in FIG. 9 are described as follows:

If the power is applied again, the CPU 11 of the system controller 1 initializes the computer and self-examines and thereafter, determines whether the computer is in the hibernation mode. If the computer is not in the hibernation mode, the CPU 11 in the controller 1 boots the computer normally. But if the computer is in the hibernation mode, the CPU 11 of the system controller 1 recovers the working environment of the computer to the former state by storing all the contents of the memory in the RAM 13.

Next, the CPU 11 of the system controller 1 determines whether the system is in the network hibernation state by checking whether the hibernation flag of the non-volatile memory indicates the network hibernation state, and invokes the resume process of the network hibernation module shown in FIG. 11 when the system is in the network hibernation state.

If the resume process of the network hibernation module is invoked, the resume processes S11–S17 of the network hibernation module are performed as follows:

At first, the CPU 11 of the system controller 1 determines whether the network hibernation is enabled. If the network hibernation is enabled, the CPU 11 in the controller 1 initializes the network interface 4. If there is the local memory in the network interface 4 in this step, its content is recovered. Next, the CPU 11 of the system controller 1 resets the network interface 4 and thereafter, enables the network interface 4.

After the resume process of the network hibernation module shown in the above is completed, the computer returns to the hibernation module. If the computer returns from the resume process of the hibernation module, the CPU 11 of the system controller 1 continues to operate the computer as in a former state before hibernation.

As shown in the above, in an embodiment of the invention, if the power supply is interrupted abruptly and is turned on again in the computer under the network environment, the working environment can be recovered to the former state. In addition, if the computer does not operate for an extended period in the network environment, the power supply is interrupted automatically, and thereafter, if the power supply is applied again, the computer recovers the former state so that the power consumed can be retrenched. The effect of this invention can be utilized in the region of the computer which has automatic backing up function in an emergency and a retrenching function of the electric power.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A computer system connected to a local area network and operable in a network environment, the computer system comprising:

a network interface for connecting said computer system to the local area network;

a data bus;

a power controller connected to said data bus, for generating a time-out signal when said computer system is in a non-use state during operation of said computer system;

a power supply connected to said data bus, for generating a power interrupt detection signal upon abrupt termination of a main power source to provide back-up power to said computer system for backing-up information comprised of data of said computer system and data from said network environment created in connection with a server for the local area network, and for terminating said back-up power upon reception of a power interrupt signal;

means for generating a hibernation signal by logically combining said time-out signal and said power interrupt detection signal;

a first memory for storing said information;

a system controller connected to said data bus, for controlling storage of said information, for generating said power interrupt signal after said information is stored in said first memory in response to said hibernation signal to set said computer system in a network hibernation state, and for recovering said information stored in said first memory and restoring said computer system in said network environment when said main power source is re-supplied to said computer system; and a second memory for storing network hibernation information for said system controller to determine whether said computer system is in said network hibernation state.

2. The network hibernation system of claim 1, wherein said second memory is a non-volatile memory for storing network hibernation information without power.

3. The network hibernation system of claim 1, wherein said power supply comprises:

an AC (alternating current) power source for supplying an AC power;

a power switch for enabling transmission of said AC power;

a linear converting rectifier comprising a transformer having a primary coil connected to the AC power source and a secondary coil connected to first and second output terminals of said linear converting rectifier via a respective diode and capacitor;

a battery and a battery charger connected in cascade to the first output terminal of said linear converting rectifier;

a power supply detector connected to the second output terminal of said linear converting rectifier, for detecting the AC power rectified by said linear converting rectifier;

a power supply state detector connected to the power switch, for detecting the AC power transmitted through said power switch;

a DC (direct current) converting controller coupled to receive output signals of said power supply detector and said power supply state detector, for detecting abrupt termination of said main power source to generate said power interrupt detection signal for providing back-up power to said computer system;

a main power source having a bridge rectifier connected between said AC power source via said power switch and a power supply, for providing first and second voltage signals;

a DC/DC converter connected to said battery charger and said DC converting controller, for providing a DC converted signal to the bridge rectifier of said main power source; and an augmented slot interrupter comprising a first transistor having a first electrode of a principal electrically conducting channel connected to receive said first voltage signal and a second electrode of said principal electrically conducting channel connected to an augmented slot, and a second transistor having a first electrode of a principal electrically conducting channel connected to a control electrode of said first transistor and connected to receive said second voltage signal and a second electrode of said principal electrically conducting channel connected to a potential terminal, and a control electrode connected to receive said power interrupt detection signal.

4. The network hibernation system of claim 3, wherein said power controller comprises:

an address decoder connected to said data bus, for decoding addresses provided from said system controller;

a mask resister connected to said data bus, for masking data provided from said system controller at the addresses decoded by said address decoder and generating a masked registered signal;

first and the second registers each coupled to receive said data provided from said system controller and the addresses decoded by said address decoder, for respectively generating first and second registered signals;

logic means for generating a logic signal by logically combining said masked registered signal and an event signal representing whether said computer system is in said non-use state;

a counter for generating a counted signal by counting said logic signal; and comparator means for generating said time-out signal upon making a comparison between said counted signal and a respective one of said first registered signal and said second registered signal.

5. The network hibernation system of claim 4, wherein said network interface comprises:

a network controller connected to said data bus, for interfacing said computer system with said local area network and enabling said computer system to communicate with the server for the local area network an oscillator connected to said network controller, for generating a clock to operate said network controller;

a boot read-only-memory connected to said data bus, for storing a booting program for booting the local area network server;

an address programmable read-only-memory connected to said data bus and said network controller, for storing addresses of said network interface;

a DC/DC converter connected to said data bus, for converting said first voltage signal into a third voltage signal having a polarity opposite of said first voltage signal;

first, second and third ports in communication with said network controller;

a transformer interposed between said network controller and said first port;

a transceiver interposed between said transformer and said second port; and a filter interposed between said network controller and said third port.

6. The network hibernation system of claim 4, wherein said system controller comprises a random-access-memory storing a network hibernation module and a read-only-memory storing a hibernation module for controlling suspension operation of said computer system in the network environment when said main power source is abruptly terminated, and for controlling resume operation of said computer system in the network environment when said main power source is re-supplied to said computer system.

7. The network hibernation system of claim 6, wherein said computer system suspends in said network hibernation state when said system controller stores said information within said first memory and said power supply terminates supply of said back-up power.

8. The network hibernation system of claim 6, wherein said computer system resumes operation in said network environment hibernation state when said information stored in said first memory is restored in a former state before hibernation.

9. A network hibernation method, comprising:

connecting a computer system to a local area network for operating in a network environment;

generating a time-out signal when said computer system is in a non-use state for a predetermined time period;

generating a power interrupt detection signal upon abrupt termination of a main power source to provide back-up power to said computer system for backing-up information comprising data of said computer system and data from said network environment created in connection with a server for the local area network, and terminating said back-up power upon reception of a power interrupt signal;

generating a hibernation signal by logically combining said time-out signal and said power interrupt detection signal;

storing said information within a first memory;

generating said power interrupt signal after said information is stored in said first memory in response to said hibernation signal and setting said computer system in a network hibernation state, and recovering said stored information and restoring said computer system in said network environment when said main power source is re-supplied to said computer system; and storing network hibernation information in a second memory for said system controller to determine whether said computer system is in said network hibernation state.

10. A suspension process of a network hibernation system having a power supply, a power controller, a system controller, a network interface and a network interface, for suspending operation era computer system connected to a local area network, said suspension process comprising:

a step in which said power supply providing energy for backing up information comprised of data of said computer system in a network environment and data from said network environment created in connection with a server for the local area network outputs a power interruption signal when a main power source is abruptly interrupted;

a step in which said power controller outputs a time-out signal, when said computer system remains inactive for a predetermined time period;

a step in which said system controller determines whether a hibernation support network driver is installed, when one of said power interruption detection signal and said time-out signal is output from one of said power supply and said power controller;

a step in which a network hibernation module is invoked when the hibernation support net-work driver is installed;

a step in which said network interface is reset when a network hibernation is determined as being enabled;

a step in which said network interface is disabled after said information of said computer system is stored in a memory:

a step in which the power from said power supply is interrupted; and a step in which said computer system is turned into hibernation.

11. A resume process of a network hibernation system having a power supply, a power controller, a system controller, a network interface and a network interface for resuming operation era computer connected to a local area network, said resume process comprising the steps of:

a step of initializing and self-examining the computer, when power is re-applied to said computer after a period of hibernation;

a step of recovering a working environment previous to a power-off by normally booting in cue the computer is not in a hibernation mode and by recovering all the contents of the computer stored in a supplementary memory in case the computer is in the hibernation mode said contents comprising data from the working environment created in connection with a server for the local area network;

a step of invoking a network hibernation module when the system is in a network hibernation mode;

a step of initializing the network interface when the network hibernation mode is enabled after the network hibernation module has been invoked;

a step of recovering the contents of a local memory when there is local memory in the network interface and resetting the network interface;

a step of returning to a hibernation module after the network interface is enabled; and a step of operating the computer in the working environment before hibernation.

12. A network hibernation system for use in a computer system operable in a network environment, said network hibernation system comprising:

a network interface for connecting said computer system with a network and enabling said computer system to operate in said network environment;

a power controller for generating a time-out signal indicating that said computer system is not active for a predetermined time period;

a power supply for supplying back-up power to said computer system by generating an ac-down signal upon indication that main power supply from a main power source to said computer system is abruptly interrupted;

means for generating a hibernation signal in response to said time-out signal and said ac-down signal;

a first memory for storing upon generation of said hibernation signal current operating information of said computer system comprised of data from said network environment created in conjunction with a network server;

a second memory for storing hibernation information indicating whether said computer system is in hibernation upon generation of said hibernation signal; and a system controller for suspending said computer system in hibernation in response to said hibernation signal after said current operating information of said computer system is stored in said first memory and said hibernation information is stored in said second memory, and for resuming operation of said computer system in said network environment when said current operating information is recovered from said first memory in response to re-application of said main power supply from said main power source to said computer system.

13. The network hibernation system of claim 12, further comprised of said system controller terminating back-up power to said computer system after said current operating information of said computer system is stored in said first memory.

14. The network hibernation system of claim 12, further comprised of second memory corresponding to a non-volatile memory for storing said hibernation information.

15. The network hibernation system of claim 12, further comprised of said power supply comprising:

a power switch for enabling transmission of said main power supply from said main power source;

a linear converting rectifier comprising a transformer having a primary coil connected to said main power and a secondary coil connected to first and second output terminals of said linear convening rectifier via a respective diode and capacitor;

a battery and a battery charger connected in cascade to the first output terminal of said linear converting rectifier;

a power supply detector connected to the second output terminal of said linear converting rectifier, for detecting said main power supply rectified by said linear converting rectifier;

a power supply state detector connected to the power switch, for detecting said main power supply transmitted through said power switch;

a converting controller coupled to receive output signals of said power supply detector and said power supply state detector, for defecting abrupt termination of said main power supply from said main power source to generate said ac-down signal providing back-up power to said computer system;

a back-up power source having a bridge rectifier connected between said main power source via said power switch, for providing first and second voltage signals;

a DC/DC converter connected to said battery charger and said direct current converting controller, for providing a DC converted signal to the bridge rectifier of said back-up power source; and an augmented slot interrupter comprising a first transistor having a first electrode of a principal electrically conducting channel connected to receive said first voltage signal and a second electrode of said principal electrically conducting channel connected to an augmented slot, and a second transistor having a first electrode of a principal electrically conducting channel connected to a control electrode of said first transistor and connected to receive said second voltage signal and a second electrode of said principal electrically conducting channel connected to a potential terminal, and a control electrode connected to receive said ac-down signal.

16. The network hibernation system of claim 12, further comprised of said power controller comprising:

an address decoder for decoding addresses provided from said system controller;

a mask register for masking data provided from said system controller at the addresses decoded by said address decoder to generate a masked signal;

first and the second registers each coupled to receive said data provided from said system controller and the addresses decoded by said address decoder, for respectively generating first and second registered signals;

logic means for generating logic signal by logically combining said masked signal and an event signal indicating whether said computer system is not active;

a counter for generating a counted signal by counting said logic signal; and comparator means for generating said time-out signal upon making a comparison between said counted signal and a respective one of said first registered signal and said second registered signal.

17. The network hibernation system of claim 16, further comprised of said network interface comprising:

a network controller for interfacing said computer system with said network enabling said computer system to communicate with said network server;

an oscillator connected to said network controller, for generating a clock to drive said network controller;

a boot read-only-memory for storing a booting program for booting said network server; an address programmable read-only-memory connected to said network controller, for storing addresses of said network interface;

a DC/DC converter for converting said first voltage signal into a third voltage signal having a polarity opposite of said first voltage signal;

first, second and third ports in communication with said network controller and said network server;

a transformer connected between said network controller and said first port;

a transceiver connected between said transformer and said second port; and a filter connected between said network controller and said third port.

18. The network hibernation system of claim 12, further comprised of said system controller including a random-access-memory storing a network hibernation module and a read-only-memory storing a hibernation module for controlling suspension operation of said computer system in said network environment when said main power source is abruptly terminated, and for controlling resume operation of said computer system in said network environment when said main power supply from said main power source is re-applied to said computer system.

19. The network hibernation system of claim 17, further comprised of said system controller including a random-access-memory storing a network hibernation module and a read-only-memory storing a hibernation module for controlling suspension operation of said computer system in said network environment when said main power source is abruptly terminated, and for controlling resume operation of said computer system in said network environment when said main power supply from said main power source is re-applied to said computer system.

20. The network hibernation system of claim 12, further comprised of said means for generating a hibernation signal in response to said time-out signal and said ac-down signal corresponding an OR gate.

21. The network hibernation system of claim 12, further comprised of said system controller resuming operation of said computer system by:

initializing said computer system, when said main power supply is re-applied to said computer system after a period of hibernation;

determining whether said computer system is set in a network hibernation mode for enabling said computer system to resume to said network environment prior to said hibernation;

when said computer system is not set in said network hibernation mode, booting said computer system to resume normal operation of said computer system not in said network environment prior to said hibernation; and when said computer system is set in said network hibernation mode, initializing said network interface, recovering all current operating information of said computer system temporarily stored in said first memory, and resuming operation of said computer system in said network environment prior to said hibernation.

* * * * *